United States Patent [19]

Dachicourt

[11] Patent Number: 5,372,289

[45] Date of Patent: Dec. 13, 1994

[54] MOTOR VEHICLE LUGGAGE COMPARTMENT HAVING A LID FOR HOLDING A STORAGE MODULE

[75] Inventor: Augustin Dachicourt, Paris, France

[73] Assignee: Regie Nationale Des Usines Renault, Boulogne Billancourt, France

[21] Appl. No.: 15,439

[22] Filed: Feb. 9, 1993

[30] Foreign Application Priority Data

Feb. 11, 1992 [FR] France ................. 92 01492

[51] Int. Cl.[5] .................................. B60J 7/10
[52] U.S. Cl. .................................. 224/311; 224/319; 224/320; 224/281; 224/42.41; 224/42.42; 224/42.44; 296/37.1; 296/37.7
[58] Field of Search ............ 224/311, 281, 310, 42.41, 224/309, 319, 320, 321, 42.42, 42.44; 296/37.7, 37.8, 37.1

[56] References Cited

U.S. PATENT DOCUMENTS

| | | | |
|---|---|---|---|
| 2,014,019 | 9/1935 | Girl | 296/37.1 X |
| 2,483,478 | 10/1949 | Smelker | 296/37.1 X |
| 2,541,244 | 2/1951 | Hack | 204/42.44 X |
| 2,547,083 | 4/1951 | Lundgren | 224/42.44 X |
| 2,577,263 | 12/1951 | Myers | 224/311 X |
| 2,639,068 | 5/1953 | Luby et al. | 224/311 X |
| 2,953,287 | 9/1960 | Werner | |
| 3,209,969 | 10/1965 | Hennagin, Jr. | 224/42.41 X |
| 3,318,471 | 5/1967 | Barr | |
| 3,473,680 | 10/1969 | Downer | 224/311 X |
| 3,534,892 | 10/1970 | Truelove, Sr. | 224/42.44 X |
| 4,305,695 | 12/1981 | Zachrich | 296/37.1 |
| 4,832,242 | 5/1989 | Leek | 224/311 |
| 5,207,470 | 5/1993 | Rafi-Zadeh | 296/37.7 |

FOREIGN PATENT DOCUMENTS

136940  6/1991  Japan ................. 224/311

*Primary Examiner*—Ernest G. Cusick
*Attorney, Agent, or Firm*—Oblon, Spivak, McClelland, Maier & Neustadt

[57] ABSTRACT

A motor vehicle luggage compartment having a luggage rack element mounted to a bottom portion of the trunk lid. A storage module or piece of luggage is removably mounted to the luggage rack element and the storage module can be immobilized within the luggage rack element. The storage module is slid into and out of the luggage rack when the trunk lid is open but immobilized when the trunk lid is closed.

9 Claims, 3 Drawing Sheets

1

MOTOR VEHICLE LUGGAGE COMPARTMENT HAVING A LID FOR HOLDING A STORAGE MODULE

BACKGROUND OF THE INVENTION

1. Field of the Invention

This invention relates to a motor vehicle luggage compartment closed by a trunk lid having a support for immobilizing a storage module and from which the storage module can be pulled out.

2. Discussion of the Background

Luggage compartments of motor vehicles are generally delimited by lateral walls, a front partition, a lid, a floor and a luggage cover. The luggage cover can consist of a lid, or a shelf.

French Patent FR-A-774951 describes a luggage compartment having a hinged lid connected to the back of the rear seats of the vehicle and in which storage modules can be individually pulled out.

French Patent FR-A-740021 describes a luggage compartment where storage modules are supported by flat surfaces which allow the storage modules to be pulled out.

Nevertheless, these known luggage compartments are not very suited to the transport of delicate items such as clothing.

SUMMARY OF THE INVENTION

Accordingly, an object of this invention is a luggage compartment and an associated storage module (piece of luggage) which is removably mounted thereto. The storage module is particularly suitable for the transport of clothing.

A further object of the invention is a luggage compartment in which the storage module, mounted on a support, occupies a volume that can be reduced depending on the contents of the luggage compartment.

These and other objects of the invention are achieved by a mounting device attached to the trunk lid and a storage module for mounting thereto. The mounting device includes a rigidifying frame surrounding a flexible panel. The storage module is formed from a pocket that has a bottom and lateral walls made of a flexible material. The material for making the storage module can be a strong fabric so as to protect objects which it supports from outside damage. Further, the material for making the storage module is flexible enough to allow, when the piece of luggage is empty and the luggage compartment full, the folding of the lateral walls of the storage module.

The invention also relates to a vehicle using a luggage compartment according to the invention in which the luggage rack element include a rear shelf luggage cover connected to a luggage compartment lid. The mounting device has an immobilization device on its lower face that cooperates with a related immobilization device of the storage module.

According to the invention, the immobilization device includes a rigidifying frame of the storage module and a slide rail on the lower face of the mounting device. The frame and slide rail thus cooperate together, to immobilize the storage module and facilitate its insertion into and removal from the luggage compartment of the vehicle. Also, the storage module slides along the slide rail when it is desired to pull the storage module out of the vehicle.

BRIEF DESCRIPTION OF THE DRAWINGS

A more complete appreciation of the invention and the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
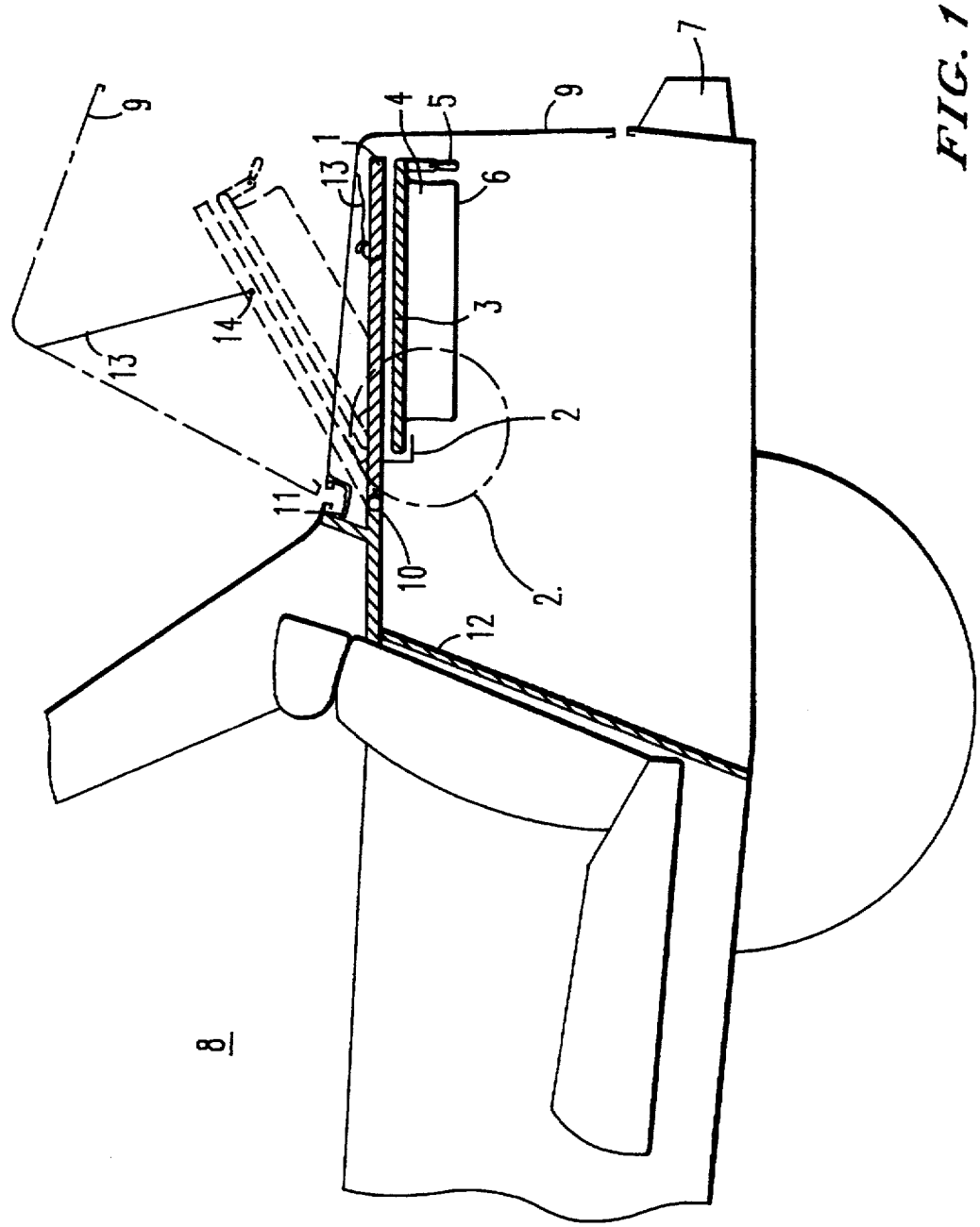
FIG. 1 is a longitudinal section of the luggage compartment whose lid is represented in its closed and open positions.
Figure 3:
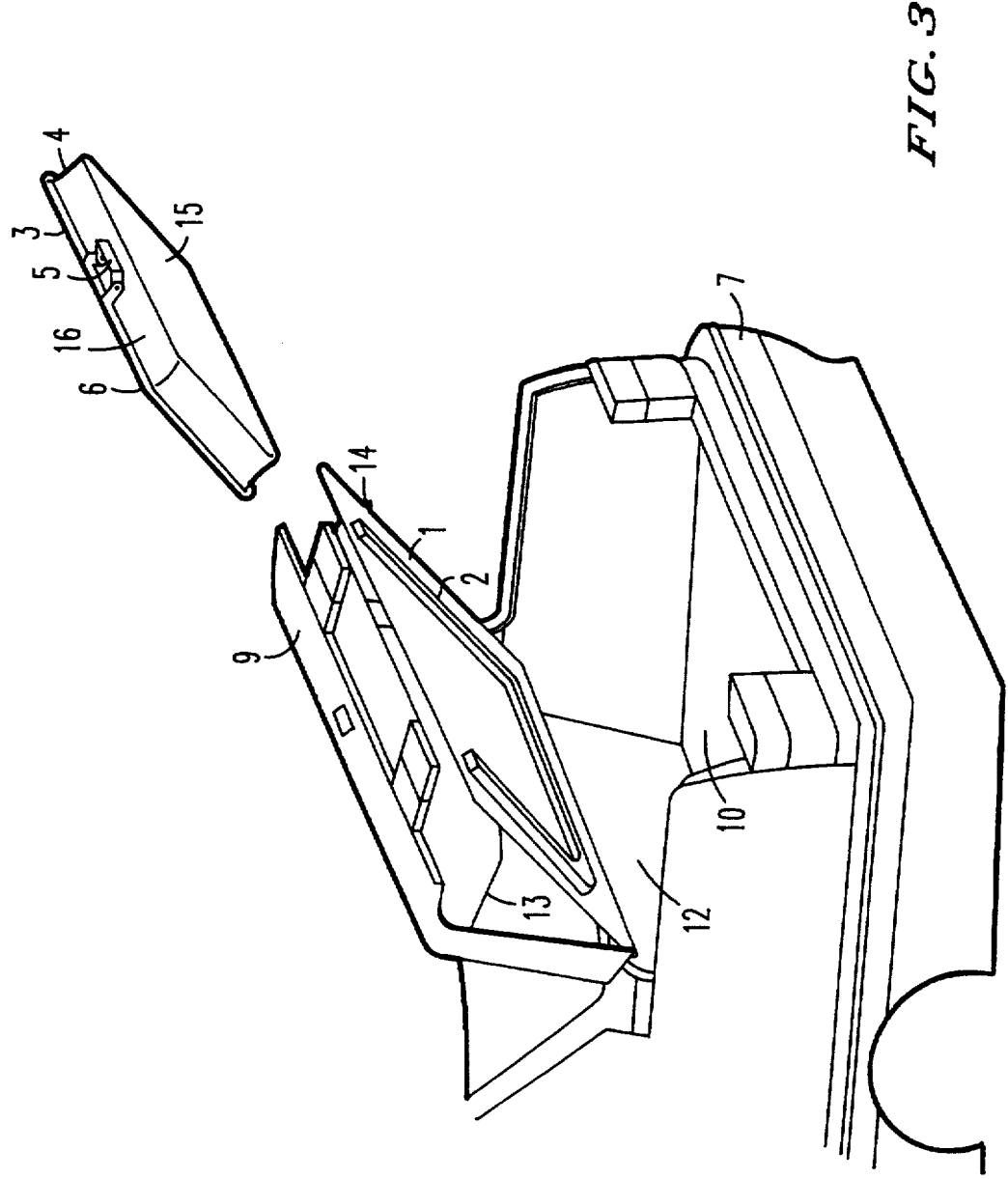
FIG. 3 is a representation in perspective of the luggage compartment in a position for receiving the storage module and with its lid open.

Referring now to the drawings, wherein like reference numerals designate identical or corresponding parts throughout the several views, and more particularly to FIGS. 1 and 3 thereof, luggage compartment 8 of a motor vehicle is closed by a trunk lid 9 equipped with a luggage rack element 1, with a storage module 6 (piece of luggage) that can be pulled out of the luggage rack element 1 and has a device for immobilizing the storage module 6. The immobilization is accomplished through the interaction of the luggage rack 1 and the storage module 6.

The immobilization device is made up more specifically of a slide rail 2, fastened at the lower part of the luggage rack 1, and of a rigidifying frame 3 delimiting the periphery of the upper part of the storage module 6, when the latter is in a storage position in the compartment 8.

Figure 2:
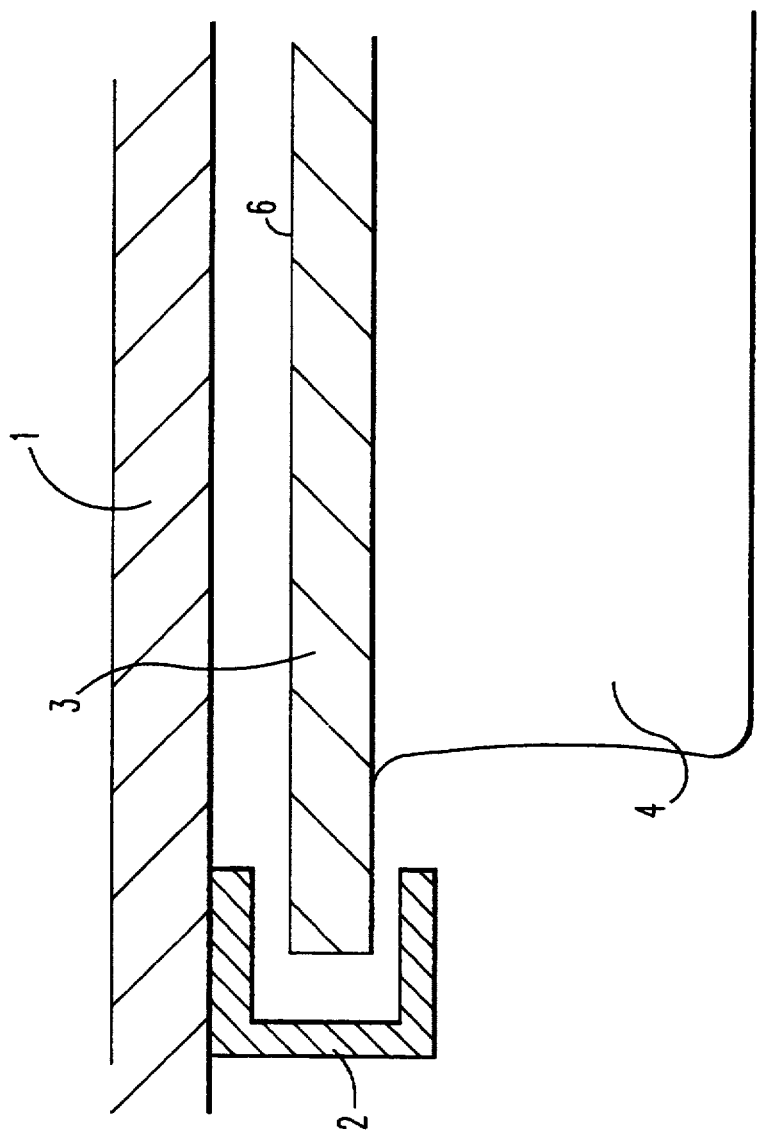
FIG. 2 is a detail of the portion marked A of FIG. 1.

Lid 9 supports the luggage rack 1 whose lower face carries the slide rail 2 having a suitable shape for slidably supporting the storage module 6. According to FIG. 2, the slide rail 2 constitutes a part of the immobilizing device for the storage module 6. The other part of the immobilization device is a rigid frame 3 of the storage module 6. This frame 3 is, for example, a male shape that is positioned in slide rail 2, to cooperate in the immobilizing of the storage module 6 during storage. The slide rail 2 slides along the frame 3 as the storage module 6 is slid into or out of the luggage compartment 8.

Pocket 4 and frame 3 make up the storage module whose handling is facilitated by a handle 5. Frame 3 delimits a flexible face, and reinforces a flexible pocket 4. The pocket 4 is formed by a bottom 15 and lateral walls 16.

According to FIG. 3, the lid 9 of the luggage compartment 8 lowers to the level of a bumper 7. For this purpose, the luggage rack element 1 and the lid 9 have separate transverse pivot pins 10 and 11 at the same height as the upper part of a front partition 12 of the luggage compartment 8. The luggage rack element 1 possesses, on the sides, fastening points 14 of straps 13, having a length which enables luggage rack element 1 to occupy a position that is compatible with the handling of the storage module. Without going outside the scope of the invention, any other system for raising or lowering the luggage rack element can be used.

The storage module 6 can alternatively be withdrawn laterally from luggage rack element 1. In addition, a device for blocking the storage module 6 in an immobilization position can have an additional system of straps.

According to another embodiment of the invention, the immobilization device can be formed by any conventional means, such as adhesive strips, hooks, clasps or any suitable immobilization device.

According to a variant embodiment, frame 3, constituting the upper part of storage module 6, incorporates a rigid panel.

According to a variant embodiment, pocket 4, constituting the lower part of the storage module 6, possesses a bottom 15 that is rigid.

According to a variant embodiment, luggage rack element 1 consists of lid 9.

Obviously, numerous modifications and variations of the present invention are possible in light of the above teachings. It is therefore to be understood that within the scope of the appended claims, the invention may be practiced otherwise than as specifically described herein.

What is claimed as new and desired to be secure by Letters Patent of the United States is:

1. A storage module for use with a luggage rack element having at least two slide rails mounted to a bottom portion of a motor vehicle trunk lid, comprising:
   a storage container; and
   guide rails, connected to at least two different ends of the storage container, for slidably mounting the storage container to the slide rails of the luggage rack element, wherein when the storage container is mounted to the slide rails of the luggage rack element, the guide rails cooperate with respective slide rails, and when the storage module is removed from the luggage rack element, said at least two slide rails of the luggage rack element remain mounted to the bottom portion of the motor vehicle trunk lid and said guide rails remain connected to said at least two different ends of the storage container.

2. A motor vehicle luggage compartment, comprising:
   a lid having a luggage rack element;
   a storage module; and
   an immobilization device attached to the luggage rack element and to the storage module, for immobilizing the storage module to the luggage rack element, the immobilization device including a slide rail guiding means positioned under the luggage rack element and a rigidifying frame connected to the storage module.

3. A motor vehicle luggage compartment, comprising;
   a lid having a luggage rack element:
   a storage element including a flexible bottom, a rigidifying frame for mounting to the luggage rack element, and flexible lateral walls connected to the bottom and to the rigidifying frame; and
   an immobilization device, attached to the luggage rack element and to the storage element for immobilizing the storage element to the luggage rack element.

4. A motor vehicle luggage compartment, comprising:
   a lid having a luggage rack element which is a hinged shelf and part of the lid;
   a storage module; and
   an immobilization device, attached to the luggage rack element and to the storage module, for immobilizing the storage module to the luggage rack element.

5. A motor vehicle luggage compartment, comprising:
   a lid having a luggage rack element which is a hinged shelf connected to the lid;
   a storage module; and
   an immobilization device, attached to the luggage rack element and to the storage module, for immobilizing the storage module to the luggage rack element.

6. A motor vehicle luggage compartment according to claim 5, wherein the immobilization device comprises:
   a slide rail guiding means positioned under the luggage rack element; and
   a rigidifying frame connected to the storage module.

7. A motor vehicle luggage compartment according to claim 5, wherein the storage module comprises:
   a flexible bottom;
   a rigidifying frame for mounting to the luggage rack element; and
   flexible lateral walls connected to the bottom and to the rigidifying frame.

8. A motor vehicle luggage compartment according claim 5, wherein the storage module comprises:
   a rigid bottom;
   a rigidifying frame for mounting to the luggage rack element; and
   lateral walls connected to the bottom and to the rigidifying frame.

9. A motor vehicle luggage compartment according to claim 5, wherein:
   the luggage rack element which is a hinged shelf is connected to the lid by straps such that after the lid is opened a predetermined distance, further opening of the lid causes the straps to lift the hinged shelf.

* * * * *